No. 656,112. Patented Aug. 14, 1900.
T. HANRAHAN.
CONVEYER AND ELEVATOR FOR REAPING AND BINDING MACHINES.
(Application filed Dec. 22, 1899.)
(No Model.) 2 Sheets—Sheet 1.
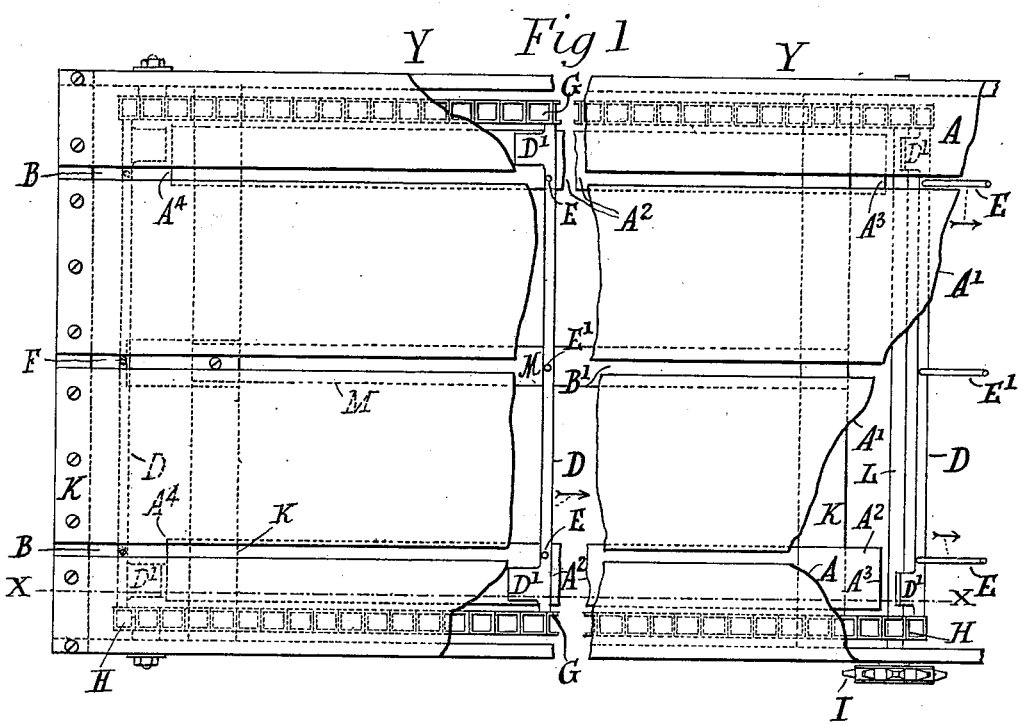
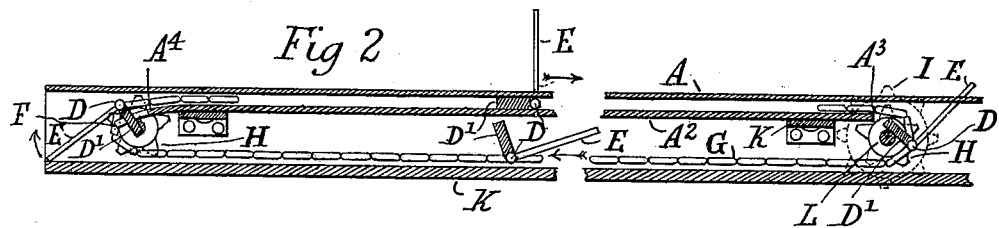
Witnesses:
Inventor
Thomas Hanrahan No. 656,112. Patented Aug. 14, 1900.
T. HANRAHAN.
CONVEYER AND ELEVATOR FOR REAPING AND BINDING MACHINES.
(Application filed Dec. 22, 1899.)
(No Model.) 2 Sheets—Sheet 2.
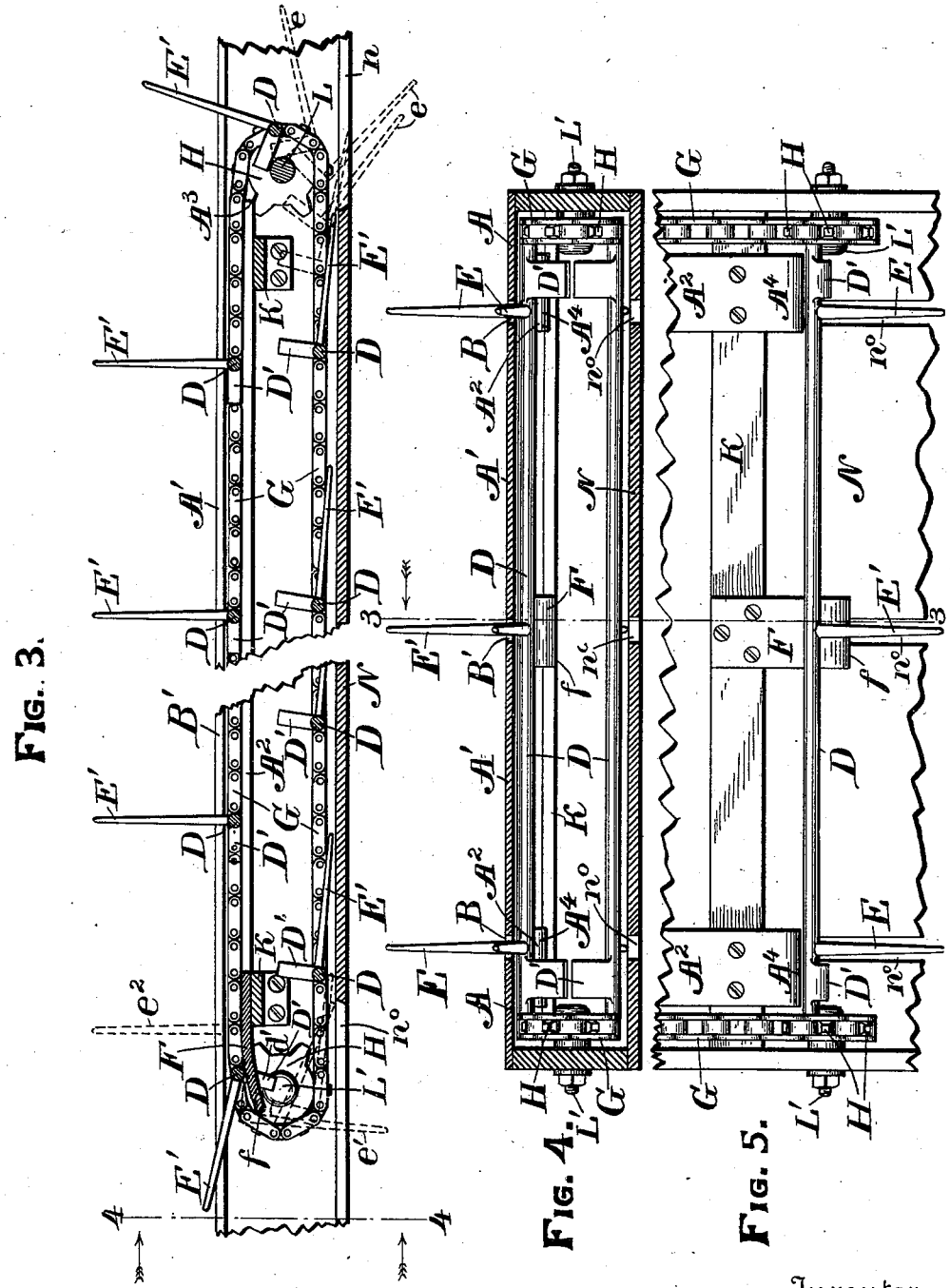

UNITED STATES PATENT OFFICE.

THOMAS HANRAHAN, OF BUNGAREE, VICTORIA.

CONVEYER AND ELEVATOR FOR REAPING AND BINDING MACHINES.

SPECIFICATION forming part of Letters Patent No. 656,112, dated August 14, 1900.

Application filed December 22, 1899. Serial No. 741,329. (No model.)

*To all whom it may concern:*

Be it known that I, THOMAS HANRAHAN, a subject of the Queen of Great Britain and Ireland, residing at Bungaree, in the Colony of Victoria, have invented certain new and useful Improvements in Conveyers and Elevators for Reaping and Binding Machines; and I do hereby declare the following to be a full, clear, and exact description of the invention, such as will enable others skilled in the art to which it appertains to make and use the same.

The object of this invention is to provide improved means for conveying and elevating the grain as it is cut by reaping and binding machines. I do not use the ordinary canvas belts; but in their place I employ a series of metal rakes, which are connected to endless chains, the latter being so arranged and driven as to carry the rakes continuously around fixed rigid platforms (usually one horizontal and one inclined) leading to the point where the cut grain is to be delivered. The said rakes have teeth which project a suitable height above the upper surface of the platforms, and thereby carry or push the cut grain forward. The novelties of this invention are comprised in the construction of the rakes and the platform and will be understood from what follows, reference being made to the accompanying drawings.

Figure 1 is a plan view of parts of a platform with my invention attached. Fig. 2 is a longitudinal section taken on the line X X of Fig. 1. Fig. 3 is also a longitudinal section, on an enlarged scale, taken on the line 3 3 in Figs. 4 and 5. Fig. 4 is a transverse section taken on the line 4 4 in Fig. 3, and Fig. 5 is a plan of one end of the conveyer with the upper platform removed.

In the figures portions are broken out and away to more clearly show other portions, and the rakes are shown in different positions. Only three teeth are shown to each rake, although in reality the number of teeth would be much larger, and any number of rakes may in practice be used, the closer they are to one another the less weight of grain having to be sustained proportionately by each rake.

The invention will be understood from the drawings, which show simply a horizontal platform. The inclined platform and its elevating rakes would be similar to that shown; but the rakes of the inclined platform would move the grain upward from the point where the rakes of the horizontal platform delivered it. Assuming now that a grain-cutting device is at the side Y of the platform in Fig. 1, the grain will then be deposited on the platform in the usual manner. The platform is composed of any number of parallel strips A A', between which are slots, as B, the center slot being marked B'. There is at each side an endless chain G, passing over sprocket-wheels H and driven continuously by any suitable means (as a chain operating a sprocket-wheel I) all the time the reaping or cutting device at Y is at work. These chains are connected at intervals by the cross bars or heads D of rakes, as shown, and the teeth of these rakes are marked E, each of the latter being in the line of one of the slots B B', so as to project through the same when the teeth are being carried along the upper surface of the platform. The central tooth is marked E'. Each rake-bar D is held down between the platform-strips A A', which lie above it and any suitable guide-plates $A^2$, parallel to and below some of said strips, as A. There may be, if desired, a larger number of guide-plates $A^2$; but I merely show two, (one at each side.) To each rake cross-bar D is also attached two or more slide-blocks D', and these are adapted to closely fit the channels between the upper strips A and lower plates $A^2$. The rake-teeth are thereby held upright, or substantially so, during work and cannot be depressed when at the upper side of the platform, and consequently they cannot fail to carry forward the cut grain which is dropped in their path. The teeth assume the aforesaid position because they are at right angles, more or less, to the blocks D' and because these blocks are kept horizontal so long as they are in the channels between the strips A and plates $A^2$.

The device I use for causing the rake-teeth to be turned down at one end of the platform and up the other, so that the rakes will follow the course of the arrows in Figs. 1 and 2, is as follows: The teeth will be drawn down naturally as the chains are carried around by the sprocket-wheels as soon as the blocks D' can escape from the channels between the upper strips A and guide-plate A². In descending the teeth will also turn to some extent. As shown, however, in the drawings, I make each lower plate terminate at A³— that is, the channels end just at the point where the sprocket-wheels tend to cause the blocks D' to begin to take a circular path. When the blocks leave the guide-plate A², they will strike the shaft L of the sprocket-wheels H, which will cause the teeth E and E' to swing around, as shown, by the dotted lines at e in Fig. 3, the bottom N of the frame being slotted, as at n, to allow the teeth to pass through as the blocks D' pass around the shaft L. The rake-teeth when under the platform will then take the position shown in Figs. 2 and 3, approximately, being retained in such position either by the weight of the teeth themselves or, if desirable, by a strip of metal fixed at a suitable distance under the slot B' and parallel thereto and secured to the framing K, said strip being shown by dotted lines at M in Fig. 1 only, and thus keeping the teeth E' from rising. To cause the teeth to again take a circular path prior to entering the slots B B', I also make the lower guide-plates short at the other end A⁴— i. e., shorter than the upper strips. The sprocket-wheels H at this end are mounted upon short stud-shafts L', thus leaving the central part open, so that the blocks D' can pass through. A curved tongue F is secured to the framing K in position to extend into the path of the central teeth E', as shown in Fig. 5, and as the blocks D' pass around the sprocket-wheel H the central teeth will strike the rounded end f of the tongue F, causing them to assume the position shown by dotted lines at e' in Fig. 3, the bottom N being slotted at n⁰ to allow the teeth to swing around. This movement will turn the blocks D' downwardly in position to strike the ends A⁴ of the strips A², as shown at d' in Fig. 3, and further movement of the chain G will bring the teeth to the position shown at e². On the left edge of Fig. 2 the rake is shown somewhat further in advance of the position seen in Fig. 1, and the central tooth E', which is hidden by the side tooth, (marked E,) has ceased to drag against the tongue F and has commenced to swing away from F toward its vertical position, as shown by an arrow. The tongue F projects, it will be seen, a greater distance toward its end of the platform than do the ends A⁴. K shows various parts of the framing of the platform, and L is the axle of sprocket-wheels H. Only one set of these wheels is shown with an axle; but in such details as this any arrangement may be adopted which is found to be mechanically suitable.

What I claim as my invention, and desire to secure by Letters Patent of the United States, is—

1. In an apparatus of the character described, the combination with the frame, provided with a platform and guides beneath said platform, sprocket-wheels mounted near the ends of said frame, endless chains passing over said sprocket-wheels, rods connecting said chains and carrying a plurality of teeth, and slide-blocks on said rods sliding between the said platform and guides; of a tongue secured to the frame and extending into the path of the teeth, engaging the latter and turning the slide-blocks into proper position to engage the said guides; substantially as described.

2. In an apparatus of the character described, the combination with the frame provided with a platform and guide-tracks beneath said platform; of sprocket-wheels mounted upon a shaft at one end of the frame, and sprocket-wheels mounted on stud-shafts in the other end of the frame, endless chains passing over said sprocket-wheels, rods running transversely of said frame and connecting said chains, a plurality of teeth carried by said rods, slide-blocks secured near the ends of the said rods at right angles to the said teeth, and sliding between the said guides and said platform, a tongue secured to the frame and extending into the path of the central teeth, and engaging the latter and turning the slide-blocks into proper position to engage the said guides, substantially as described.

In testimony whereof I affix my signature in presence of two witnesses.

THOMAS HANRAHAN.

Witnesses:
E. F. NICHOLLS,
W. H. CUBLEY.